United States Patent
Shah et al.

(10) Patent No.: US 8,868,855 B2
(45) Date of Patent: Oct. 21, 2014

(54) REQUEST MANAGEMENT SYSTEM AND METHOD FOR DYNAMICALLY MANAGING PRIORITIZED REQUESTS

(75) Inventors: Biren Narendra Shah, Sunnyvale, CA (US); Scott Friedheim, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 441 days.

(21) Appl. No.: 13/036,948

(22) Filed: Feb. 28, 2011

(65) Prior Publication Data

US 2012/0221810 A1 Aug. 30, 2012

(51) Int. Cl.
*G06F 13/16* (2006.01)
*G06F 9/48* (2006.01)

(52) U.S. Cl.
CPC ............ *G06F 13/16* (2013.01); *G06F 13/1642* (2013.01); *G06F 9/4887* (2013.01)
USPC .......................................... 711/158; 718/102

(58) Field of Classification Search
USPC .......................................................... 710/41
See application file for complete search history.

(56) References Cited

U.S. PATENT DOCUMENTS

| | | | | |
|---|---|---|---|---|
| 6,006,303 | A * | 12/1999 | Barnaby et al. | 710/244 |
| 6,501,762 | B1 * | 12/2002 | Pillar et al. | 370/412 |
| 6,871,011 | B1 * | 3/2005 | Rahman et al. | 386/293 |
| 7,093,004 | B2 | 8/2006 | Bernardin et al. | |
| 7,720,968 | B2 | 5/2010 | Clarke et al. | |
| 7,860,120 | B1 * | 12/2010 | Wang et al. | 370/418 |
| 2002/0091746 | A1 * | 7/2002 | Umberger et al. | 709/105 |
| 2002/0122387 | A1 * | 9/2002 | Ni | 370/231 |
| 2003/0225644 | A1 * | 12/2003 | Casati et al. | 705/35 |
| 2005/0210321 | A1 * | 9/2005 | Bai et al. | 714/13 |
| 2005/0240934 | A1 * | 10/2005 | Patterson et al. | 718/105 |
| 2006/0195508 | A1 | 8/2006 | Bernardin et al. | |
| 2007/0011683 | A1 | 1/2007 | Helander | |
| 2007/0038791 | A1 * | 2/2007 | Subramanian et al. | 710/116 |
| 2007/0198768 | A1 * | 8/2007 | Kim et al. | 711/103 |
| 2008/0010642 | A1 * | 1/2008 | MacLellan et al. | 718/102 |
| 2008/0016508 | A1 * | 1/2008 | Goto et al. | 718/102 |
| 2008/0104283 | A1 * | 5/2008 | Shin et al. | 710/6 |
| 2008/0172419 | A1 | 7/2008 | Richards et al. | |
| 2010/0153963 | A1 | 6/2010 | Kakarlamudi et al. | |
| 2011/0072178 | A1 * | 3/2011 | Mace | 710/244 |

OTHER PUBLICATIONS

John R. Douceur and William J. Bolosky. "Progress-based Regulation of Low-importance Processes." Dec. 1999. ACM. SOSP-17. pp. 247-260.*
Beshah, Belay T., et al. "Distributed Computing in Ground Processing"; 6 pages, 2004.

* cited by examiner

*Primary Examiner* — Nathan Sadler (57) ABSTRACT

A request management system includes a request priority queue module prioritizing requests to be placed in queues based on priorities, and a request priority rule module setting an order of placement of the requests in the queues. The request management system further includes a computerized request monitoring and management module dynamically managing processing of a request from the prioritized requests based on a request processing statistic, the priorities and the order of placement.

20 Claims, 6 Drawing Sheets

QUEUE-1

| 1 | PRIORITY-1 |
|---|---|
| 2 | PRIORITY-1 |
| 3 | PRIORITY-1 |
| 4 | PRIORITY-1 |
| 5 | PRIORITY-1 |
| 6 | PRIORITY-1 |
| 7 | PRIORITY-1 |
| 8 | PRIORITY-1 |
| 9 | PRIORITY-2 |
| 10 | PRIORITY-2 |

| N | PRIORITY-n |
|---|---|

QUEUE-X

| 1 | |
|---|---|
| 2 | |
| 3 | |
| 4 | |
| 5 | |
| 6 | |
| 7 | |
| 8 | |
| 9 | |
| 10 | |

| N | |
|---|---|

QUEUE-1

| 1 | PRIORITY-1 |
| 2 | PRIORITY-1 |
| 3 | PRIORITY-1 |
| 4 | PRIORITY-1 |
| 5 | PRIORITY-1 |
| 6 | PRIORITY-2 |
| 7 | PRIORITY-1 |
| 8 | PRIORITY-1 |
| 9 | PRIORITY-1 |
| 10 | PRIORITY-2 |

| N | PRIORITY-n |

QUEUE-X

| 1 | |
| 2 | |
| 3 | |
| 4 | |
| 5 | |
| 6 | |
| 7 | |
| 8 | |
| 9 | |
| 10 | |

| N | |

REQUEST MANAGEMENT SYSTEM AND METHOD FOR DYNAMICALLY MANAGING PRIORITIZED REQUESTS

BACKGROUND

In a distributed systems environment where requests are made from a Centralized Location (CL) to multiple servers, requests may be attempted to be processed as efficiently and reliably as possible. Such requests can be of many different types and can vary in importance or priority. Some request types can be more sensitive to failure, whereas other requests can be more tolerant. Requests can also significantly differ in the amount of time they take to process, which can depend on many factors including the complexity of the task involved. Due to the large volume of requests of different types, it can be difficult to manage these requests throughout the request cycle, from the time a request is submitted from the CL to the time the CL receives responses/results from all the servers involved. In order to process and manage requests, the First-In-First-Out (FIFO) order is typically used to queue and process requests, but FIFO processing is inefficient.

Hard timeout periods can be used to manage and monitor load from requests, where a timeout period is the total amount of time any one request can take throughout its entire process. If a request takes longer to process than the timeout period, the request is typically dropped, commonly resulting in a failure to process the request. Alternatively, if a request is being processed on a server that is unable to perform the necessary operations, the CL would needlessly wait until expiration of the timeout period before initiating request cancellation.

BRIEF DESCRIPTION OF DRAWINGS

The embodiments are described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent that the embodiments may be practiced without limitation to all the specific details. Also, the embodiments may be used together in various combinations.

1. Overview

According to an embodiment, a request management system processes requests based on priority and dynamic timeout periods. For example, the request management system prioritizes requests to be placed in queues based on priorities, sets an order of placement of the requests in the queues, and dynamically manages processing of a request from the prioritized requests based on a request processing statistic, the priorities and the order of placement. Prioritizing the requests for processing improves the ability to process higher priority requests quicker than conventional FIFO processing. Also, the system may include rules that account for starvation, so requests in lower priority queues also get processed. In addition, the system implements a dynamic timeout period based on processing statistics. The dynamic timeout period allows for requests to continue processing if processing is sufficiently progressing. Thus, requests may not be prematurely dropped as opposed to systems that use static timeouts.

2. System

Figure 1:
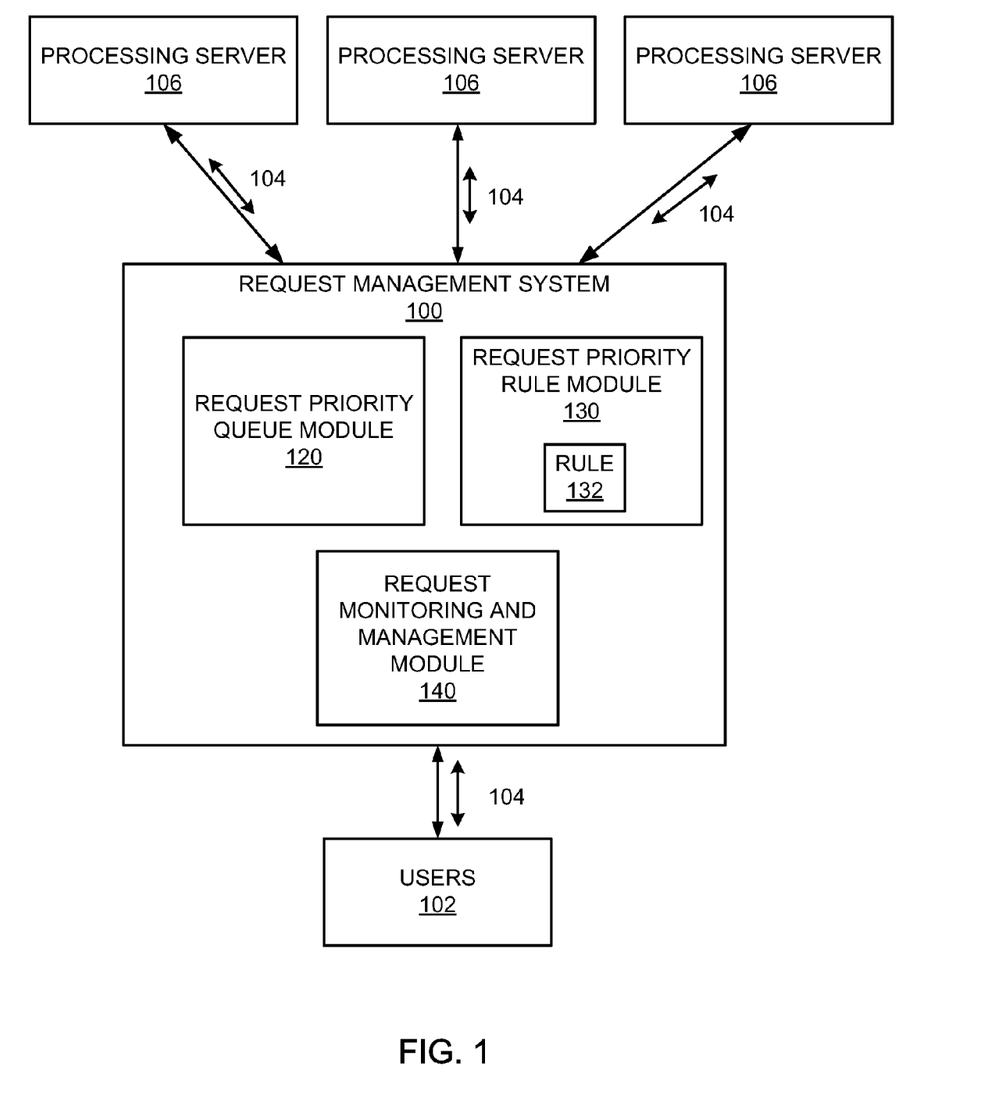
FIG. 1 illustrates a system, according to an embodiment.

FIG. 1 illustrates a request management system 100, according to an embodiment. The system 100 may be implemented in a distributed systems environment, or any other environment where requests or other similar types of data are processed. The system 100, for example, is connected to users 102 that forward requests 104 to processing servers 106 via the system 100. The connections may be provided through a network or multiple networks. The users 102 may include computers used by users. The users 102 may include end user devices or larger systems. The system 100 receives requests from the users 102. A request may include any type of action or information that is requested. A request may include queries. The system 100 manages the requests, for example, through prioritization, other predefined or customizable rules, and dynamic timeouts, as is described in further detail below. Based on the management, the system 100 sends the requests to the processing servers 106 for execution. The processing servers 106 store data and also execute the requests. The system 100 may receive responses to the requests from the processing servers 106 and send the responses to the corresponding users making the requests.

In one example, the system 100 is used in an archiving system. The archiving system may archive emails or other data. The archiving system may be HEWLETT-PACKARD's Integrated Archive Platform (IAP), and the system 100 may be provided with or within the IAP. In the IAP, a HTTP Portal (HP) receives requests and sends responses. In the IAP, the processing servers are referred to as Smart Cells (SC). Due to the large number of requests processed by the system 100, the system 100 may include several servers and support a range of request types.

Examples of requests include content, hash and ping queries. A content query may be user driven and may be slow if the query covers multiple indexes across single or multiple SCs spanning/searching, for example, across millions of documents. Indexes may be formed from partitioning or allocation of a or processing server in terms of data storage size. Indexes may also be formed from any other categorization of a SC or processing server, for example, time (e.g. hours, days, weeks, months etc.) for facilitating search, storage and retrieval of information. Hash queries may check for the existence of a stored document. For example, a hash query is used for single instancing (e.g. de-duplication) and document path resolution (e.g. if a document has migrated to a different processing server 106). Ping queries are relatively fast, such as a fraction of a second. A ping query may be used to ping each processing server every minute and are used as a health check. The processing servers 106 may be provided in pairs, called primary and secondary, and content as well as hash queries may be load balanced across primary and secondary processing servers.

Figure 2:
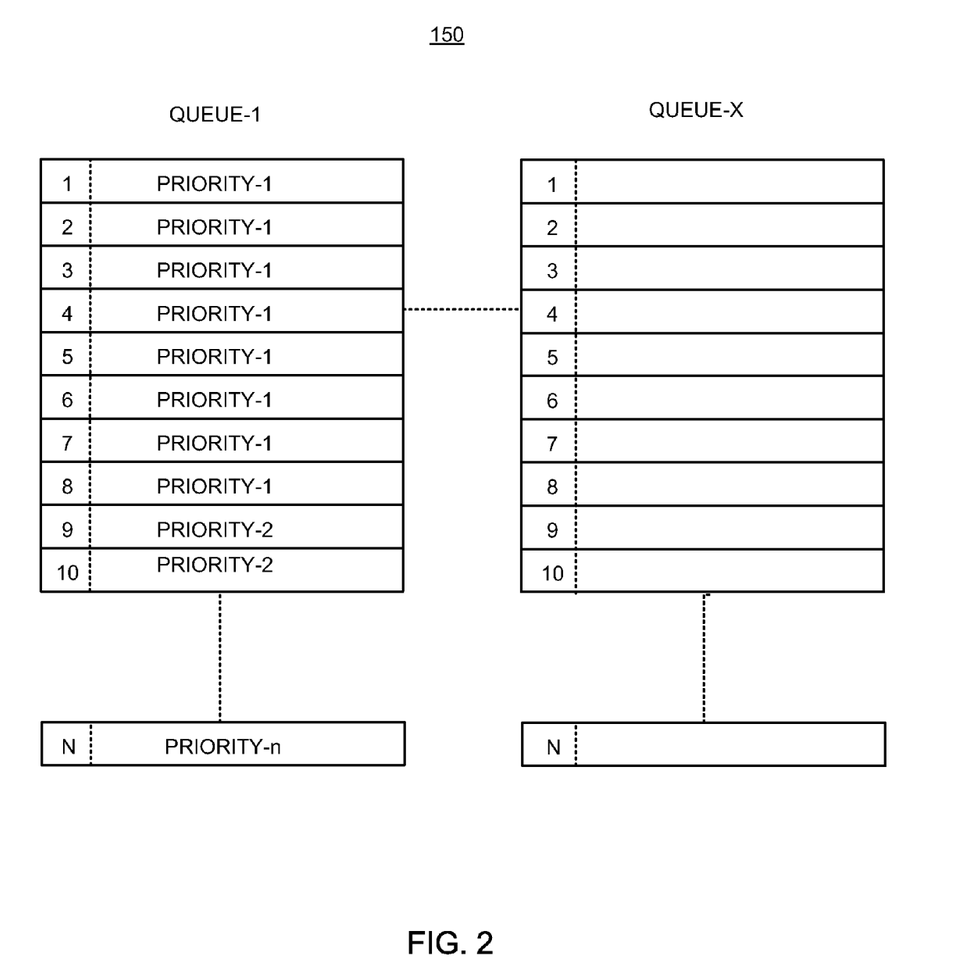
FIG. 2 illustrates an example of a queue, according to an embodiment.

Referring to FIGS. 1 and 2, requests may be characterized by factors such as the length of time it takes or would be expected to take to complete a request, the complexity of a request or the importance of a request. For the IAP example or a distributed system generally, since high loads of query requests are expected to be efficiently and effectively handled, a request priority queue module 120 is provided for prioritizing requests to be placed in a queue 150. For the IAP example, module 120 would respectively prioritize the ping, hash and content queries in order of priority-1, priority-2 and priority-3. As shown in FIG. 2, for a distributed system generally, N-requests can be similarly prioritized in order from priority-1 to priority-n for placement in the queues 150 (queue-1 to queue-X). Thus for the IAP example, the priority queue configuration would be based on factors such as how fast a query processes (e.g. the complexity of the query), thus assigning higher priorities to faster running queries such as ping or hash queries to allow such queries to complete quickly. The performance sensitivity of a request (or query for the IAP example) which is time sensitive may also factor into assignment of a higher priority to a request type (e.g. a false failure of a ping query can result in unnecessary failover procedures, thus compromising system performance). Other queries such as content queries that may need moderate to heavy processing and are more tolerant to failure may be assigned lower priorities.

The request priority queue module 120 thus enables queuing and ordering of requests (or queries for the IAP example) based on priorities that can be predetermined or user implemented for customized priority queuing. Thus a user can readily define a custom priority based on what will be stored in a queue so as to optimize operation of the request management system 100. The priorities for the requests 104 may be implemented by buffers (e.g. three buffers may be used to separate the ping, hash and content type queries for the IAP example). In this manner, the request management system 100 can use buffers for example to handle and prioritize an unlimited number of requests and have an unlimited number of priorities.

Figure 3:
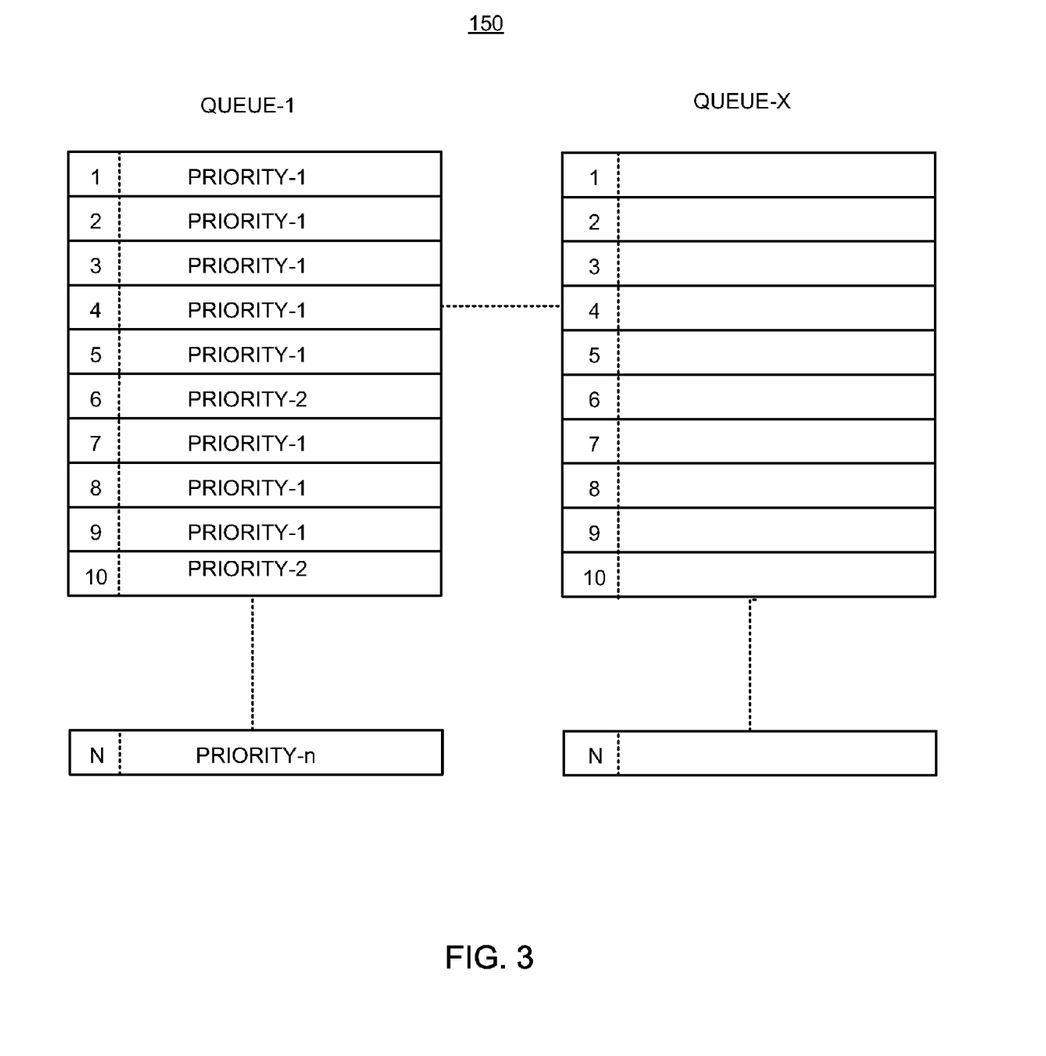
FIG. 3 illustrates an example of a queue, according to an embodiment.

The request management system 100 may also include a request priority rule module 130 operable with the request priority queue module 120 to prevent starvation of any particularly request, and for setting an order of placement of the requests in a queue. For example, since the request management system 100 can be subjected to handling of hundreds or thousands of requests simultaneously, if requests are always handled in order of priority, lower priority requests can be potentially starved, for example, by being in the queue indefinitely because a large number of higher priority requests exist in the queue and are always allowed to run first. In order to address this, referring to FIG. 1, the request priority rule module 130 includes a rule 132 that enables allocation and handling of lower priority requests, and thus sets a queue order to enable processing of a request of each different priority type at a predetermined interval in the queue. Referring to FIGS. 1-3, in an example, the rule 132 may be defined such that for a request management system that handles three types of requests (e.g. ping (priority-1), hash (priority-2) and content (priority-3) queries for the IAP example), for every 10 requests that are handled, if the last five requests were priority-1 requests, then the sixth request in the queue should be a priority-2 or priority-3 request. Thus as shown in the first queue 150 of FIG. 2, without application of the rule 132, the first eight requests are priority-1, and the last two requests are priority-2. After application of the rule 132, as shown in FIG. 3, the first five requests are priority-1, the sixth request is priority 2, the seventh to ninth requests are priority-1 again, and the tenth request is priority 2. Further, rule 132 may be defined such that for every 10 requests that are handled, if the last nine requests were priority-1 and priority-2 requests, then the tenth request in the queue should be a priority-3 request. In this manner, for the request management system 100 handling three requests, all priority-1 to priority-3 requests can be processed in a given priority order, in conjunction with request priority rule module 130, thus preventing starvation of any single request type.

The rule 132 may be customizable by a user based on the types of specific requests encountered and to suit the particular user's request management requirements. The rule 132 may also include other factors such as penalties for starvation or other delays associated with a particular request type for designating a particular priority order.

Referring to FIG. 1, the request management system 100 may further include a request monitoring and management module 140 to enable the system 100 to dynamically manage request completion, based on, for example, request progress results from the processing server(s) 106 (e.g. SC in IAP example). Operation of the system 100 and servers 106 will be described for facilitating the description of the request monitoring and management module 140. As shown in FIG. 1, in order to process the request 104, the request management system 100 receives requests (e.g. queries in the IAP example) from various users 102. The requirements for each of the request 104 may be determined and prioritized into a queue as shown in FIGS. 2 and 3 by the request priority queue module 120 and the request priority rule module 130. A request may then be selected and sent to all the processing servers 106 (SC in the IAP example) from which request results are needed. Processing server 106 receives the request from the request management system 100 and processes the request, returning results back to the system 100.

Upon receipt of a request from the request management system 100, the processing server 106 may create request progress information and periodically transmit the information to the request management system 100, or otherwise transmit the information to the system 100 upon request. The creation and transmission of such request progress information enables monitoring and management of a request by the request monitoring and management module 140 and thus the request management system 100. The request progress information may include statistics for facilitating efficient completion of a request and pending requests, with the statistics including information such as the amount of work that has been completed based on metrics such as number of results fetched, validity of a request, rate of completion of a request, number and size of indexes processed, time elapsed, etc., and also including information related to how much work is remaining based on metrics such as number of results remaining to be fetched, size and number of indexes remaining to be processed, etc. The metrics related to the remaining work may be calculated based on the contents of a particular request and the organization of a given processing server 106. For example, a processing server 106 may be indexed by time (e.g. months or years), where the size of a particular index would be known. In this manner, the foregoing metrics related to remaining work could be readily determined by ascertaining which indexes of a particular processing server contain results requested by a particular request. Other examples of indexes may be categorized by a variety of factors, such as client type, individual name, and generally any user defined variable.

The request processing server 106 may use the foregoing statistics based on past performance of a currently processing request and apply heuristics to calculate, for example, an estimated time remaining for the request, and the rate of completion or processing of indexes. The estimated time remaining for a request completion may be based on, for example, the processing time of a given request and the amount of data ascertained, compared to the amount of data remaining to be ascertained. For a given SC, the progress of two or multiple requests with similar or different parameters may also be compared to determine if the relative progress of each request is acceptable for adequate system resource utilization. For example, given two requests, if one complex request in a given time period is determined to have processed more information than a simple request, the simple request may be determined as making unacceptable progress. The progress of each running and/or pending request 104 may be created and maintained on every processing server 106. All the request progress information from every processing server 106 that is to respond to a particular request may be obtained from the appropriate server 106 by the request management system 100 while waiting to receive request results. This can occur on a schedule (e.g. every two minutes) where the request management system 100 aggregates the progress information and evaluates total request progress per processing server and all the processing servers as a group. For certain requests with short timeout periods (e.g. ping requests for the IAP example), progress monitoring or the extent of progress monitoring may be limited to yet further preserve system resources.

As part of the evaluation, the request management system 100 via the request monitoring and management module 140 may compare current progress with past progress for the currently processed request (e.g. progress at two different times, where the first time may be at time t=0, or a time after commencement of request processing), and depending on if sufficient progress has been made, the request management system 100 may dynamically take actions such as retransmitting, requeuing, canceling or waiting. When comparing current progress with past progress, a threshold, such as a percentage threshold based on an expected amount of work to be completed may be set or dynamically calculated and implemented to determine if sufficient progress has been made. The threshold may include factors based on the foregoing request progress statistics measured and calculated by the processing server 106. For example, the threshold when being based on an expected completion percentage may compare a completion percentage of a request at a given instance to a previous completion percentage, and compare both or the latter completion percentage value to an expected completion percentage value. The threshold may also be modified based on the request priority type (e.g. a higher priority request may have a higher completion percentage requirement than a lower priority request). Thus the overall request progress may be based on the combined weight of several statistics, and no single statistic would necessarily render a request progress unacceptable. The request management system 100 may thus manage and organize results from all processing servers and finally return consolidated results back to the client when all processing servers have returned their results.

The retransmit, requeue, cancel and wait actions performed by the request management system 100 will now be described.

Retransmit: Retransmission of a request may occur if a processing server 106 is not responsive (e.g. shut down, application server crashed, etc.) to the progress check (e.g. the foregoing two minute progress check). In this case, a request may be re-submitted to a different processing server (e.g. the secondary processing server) which can return the same information as the first processing server.

Requeue: Requeuing of a request may occur if sufficient progress is not made by a processing server 106 in processing the request, in which case the request may be requeued (at the end or at another higher location than the original location in a request priority queue) thereby temporarily freeing up resources to allow the request management system 100 to process another request from the request priority queue.

Cancel: Cancellation of a request may occur if a processing server 106 is still not responsive (e.g. shut down, processing server crashed, etc.) after request retransmission to a different processing server (e.g. secondary processing server). Upon request cancellation, the resources of the request management system 100 are thus made available for new incoming and/or existing pending requests. Cancellation of a request can also occur if sufficient progress is not made by a given processing server 106 and the request has already been requeued once, in which case the request may be canceled freeing up resources of the request management system 100 and likewise making the resources available for new incoming and/or existing pending requests.

Wait: Waiting for a request may occur if, for example, sufficient progress has being made. In this case, the request monitoring and management system 140 recommends waiting to get request results from the processing server 106 without initiating or recommending request retransmission, requeuing or cancellation. In other words, the timeout for a particular request may be dynamically changed (e.g. extended) based on the completion status of the request.

The request monitoring and management module 140 may be customizable to implement the retransmit, requeue, cancel and wait actions in a conservative manner by first retransmitting or requeuing a stalled or slow progressing request, instead of immediately resorting to request cancellation. If a retransmitted query still stalls or progresses unacceptably, the request may be canceled. With regard to the foregoing threshold of expected work to be completed, the request monitoring and management module 140 may retransmit, requeue or cancel a request if the progress is less than a threshold value, or alternatively, wait for request completion if the progress is greater than or equal to the threshold. In the latter case, the request monitoring and management module 140 may extend a timeout period for request completion if the progress is greater than or equal to the threshold to enable request completion.

Based on the foregoing, the request monitoring and management module 140 dynamically manages timeouts, and further manages progress of each request. Based on the progress, the module 140 may dynamically control the preset timeout for a particular request for optimizing processing and completion of the request, and also other pending requests.

The foregoing request priority queue module 120, the request priority rule module 130 and the request monitoring and management module 140 may be implemented separately or in combination in a distributed systems environment to provide for request management. Based on the foregoing discussion, implementation of the request management system 100 in or with the IAP results in reduction in query request timeouts. Request throughput also increases for all request types, including faster running but more sensitive request types, which prior to implementation of the request management system 100 could experience longer delays due to slower running requests in a FIFO based system and static request timeouts. Implementation of the request management system 100 also results in faster request response (e.g. faster query returns) and a higher success rate of request completion, and further enables higher resource and network bandwidth utilization.

Yet further, implementation of the request management system 100 in the IAP improves the overall request processing time and throughput, for example, by processing requests based on priorities while also preventing starvation of any given request type. The request management system 100 also provides for monitoring and evaluation of request progress based on request timeout, or for effectively modifying request timeout. As discussed above, examples of methods of request progress monitoring and management include resubmitting a request to a secondary processing server if a primary processing server is unreachable, timing out a request and releasing resources sooner if a request is determined as not making any or sufficient progress, or preventing a request from timing out sooner than necessary if a request continues making progress but would otherwise timeout.

3. Method

Figure 4:
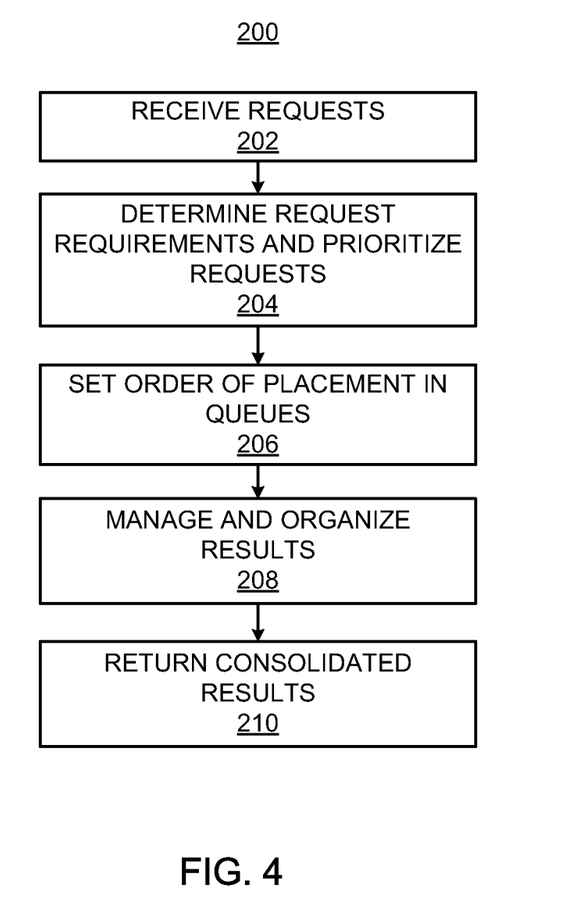
FIG. 4 illustrates a method for request management, according to an embodiment.
Figure 5:
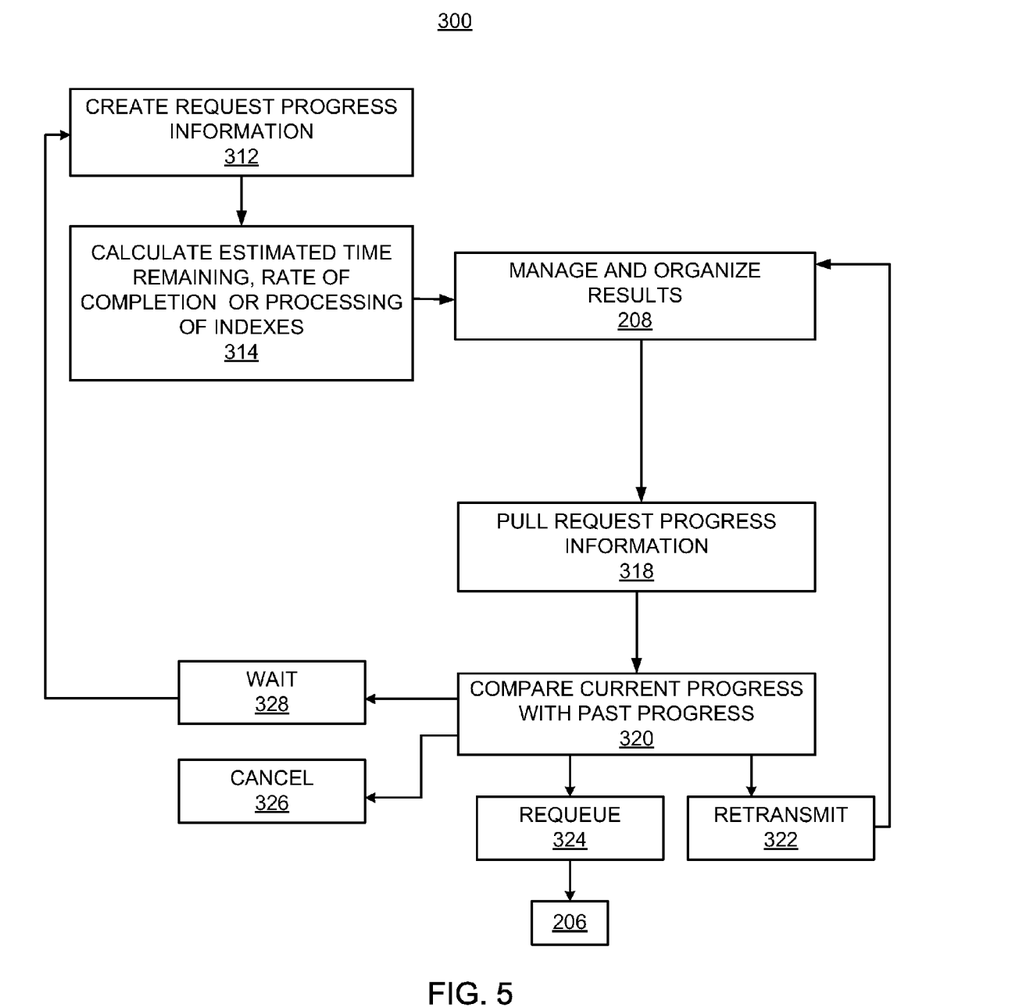
FIG. 5 illustrates a method for managing and organizing results, according to an embodiment.

FIG. 4 illustrates a method 200 for request management, according to an embodiment, and FIG. 5 illustrates details of a method 300 for managing and organizing results, according to an embodiment. The methods 200 and 300 are described with respect to the request management system 100 shown in FIG. 1 by way of example and not limitation. The methods 200 and 300 may be performed by other systems.

As shown in FIG. 4, in order to process a request 104, at block 202, the request management system 100 (HP in the IAP example) receives requests (queries in the IAP example) from various users 102. At block 204, the request management system 100 determines the requirements for each request 104 and prioritizes the requests to be placed in the queues 150 based on priorities via the request priority queue module 120. At block 206, the request priority rule module 130 sets an order of placement of the requests 104 in the queues 150. At block 208, the request management system 100 manages and organizes results along with the request monitoring and management module 140 by first selecting and sending the request 104 to all processing servers 106 (SC in the IAP example) from which request results are needed. The processing servers 106 receive the request 104 from the request management system 100 and processes the request, returning results back to the system 100. The management of the request 104 by the request management system 100 and processing of the request 104 by the processing server 106 will be discussed in further detail with respect to FIG. 5. At block 210, the request management system 100 returns consolidated results back to the user 102 when all processing servers have returned their results.

Referring to FIG. 5, for block 208, the system 100 and the module 140 monitor and manage processing of the request 104 by the processing server 106. At block 312, request progress information is created by the processing server(s) 106 and periodically transmitted to module 140 of the request management system 100, or otherwise transmitted to system 100 upon request. As discussed in detail above with respect to operation of the request monitoring and management module 140, the creation and transmission of such request progress information enables monitoring and management of a request by the module 140 and thus the request management system 100. As also discussed above, the request progress information may include statistics for facilitating efficient completion of a request and pending requests, with the statistics including information related to the amount of work that has been completed based on metrics such as number of results fetched, validity of a request, number and size of indexes processed, time elapsed, etc., and also including information related to how much work is remaining based on metrics such as number of results remaining to be fetched, size and number of indexes remaining to be processed, etc. The metrics related to the remaining work may be calculated based on the contents of a particular request and the organization of a given processing server 106 as discussed above.

At block 314, the request processing server 106 uses the foregoing statistics based on past performance of the current request and applies heuristics to calculate, for example, an estimated time remaining for the request, the rate of completion or processing of indexes. This progress information is transmitted to module 140 at block 208 to enable management of request progress results.

At block 318, the request progress information from every processing server 106 that is to respond to a particular request may be pulled from the appropriate server 106 by the request management system 100 while waiting to receive request results. As discussed in detail with respect to the operation of the request monitoring and management module 140, this can occur on a schedule (e.g. every two minutes) where the request management system 100 aggregates the progress information and evaluates total request progress per processing server and all the processing servers as a group.

At block 320, as part of the evaluation, the request management system 100 via the request monitoring and management module 140 compares current progress with past progress for the current request and depending on if sufficient progress has been made, the system 100 dynamically takes actions such as retransmitting, requeuing, canceling or waiting (see blocks 322, 324, 326 and 328 of FIG. 5). When comparing current progress with past progress, a threshold, such as a percentage threshold based on an expected completion percentage may be set or dynamically calculated and implemented to determine if sufficient progress has been made. If a request is retransmitted, requeued, or placed in a waiting status, the request management process respectively returns to blocks 208, 206, 312 for continued processing of a request.

4. Computer Readable Medium

Figure 6:
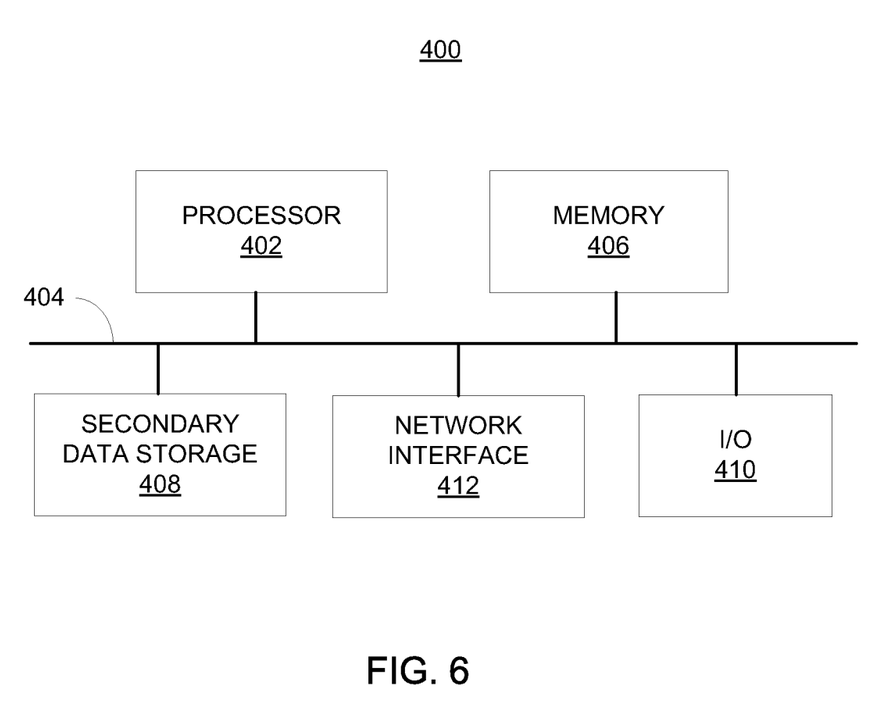
FIG. 6 illustrates a computer system that may be used for the method and system, according to an embodiment.

FIG. 6 shows a computer system 400 that may be used with the embodiments described herein. The computer system 400 represents a generic platform that includes components that may be in a server or another computer system. The computer system 400 may be used as a platform for the system 100. The computer system 400 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 includes a processor 402 that may implement or execute machine readable instructions performing some or all of the methods, functions and other processes described herein. Commands and data from the processor 402 are communicated over a communication bus 404. The computer system 400 also includes a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums.

The computer system 400 may include an I/O device 410, such as a keyboard, a mouse, a display, etc. The computer system 400 may include a network interface 412 for connecting to a network. Other known electronic components may be added or substituted in the computer system 400.

While the embodiments have been described with reference to examples, various modifications to the described embodiments may be made without departing from the scope of the claimed embodiments.

What is claimed is:

1. A request management system comprising:
    a memory storing machine readable instructions to:
        prioritize requests to be placed in a queue based on priorities;
        set an order of placement of the requests in the queue to enable processing of at least one request of each different priority placed in the queue at a predetermined interval based on request priority, wherein the predetermined interval is configurable such that a request of a higher priority is processed after a request of a lower priority; and
        dynamically manage processing of a request from the prioritized requests based on a request processing statistic, the priorities and the order of placement, wherein the request processing statistic includes a progress of the request, and the request includes a timeout period, and wherein to dynamically manage processing of the request further comprises:
            comparing the progress of the request to a threshold;
            in response to a determination that the progress of the request is less than the threshold, retransmitting, requeuing or canceling the request, and
            in response to a determination that the progress of the request is greater than or equal to the threshold:
                determining a new timeout period based on the progress of the request, and
                extending the timeout period of the request to the new timeout period to enable request completion, and
    a processor to implement the machine readable instructions.

2. The request management system of claim 1, wherein the machine readable instructions to prioritize requests to be placed in the queue further comprise machine readable instructions to prioritize the requests based on a length of time to complete a request, complexity of a request, or importance of a request.

3. The request management system of claim 1, wherein the progress is based on an amount of work completed by the request.

4. The request management system of claim 1, wherein the progress is based on an amount of time elapsed towards completion of the request.

5. The request management system of claim 1, wherein the progress is based on a rate of completion of the request.

6. The request management system of claim 1, wherein the progress is based on a comparison of an amount of work completed by the request at different times.

7. The request management system of claim 6, wherein the comparison of the amount of work completed by the request at different times is based on the threshold based on an expected amount of work to be completed by the request.

8. The request management system of claim 1, wherein the threshold is a dynamically calculated threshold.

9. The request management system of claim 1, further comprising machine readable instructions to dynamically manage processing of the request based on comparison of a progress of a plurality of requests.

10. The request management system of claim 1, wherein the predetermined interval is further based on a predetermined number of requests of each different priority.

11. The request management system of claim 1, wherein the threshold is modifiable based on a request priority type such that a higher priority request has a different threshold than a lower priority request.

12. A method for request management, the method comprising:
    prioritizing requests to be placed in a queue based on priorities;
    setting an order of placement of the requests in the queue to enable processing of at least one request of each different priority placed in the queue at a predetermined interval based on request priority, wherein the predetermined interval is configurable such that a request of a higher priority is processed after a request of a lower priority; and
    dynamically managing, by a processor, processing of a request from the prioritized requests based on a request processing statistic, the priorities and the order of placement, wherein the request processing statistic includes a progress of the request, and the request includes a timeout period, and wherein dynamically managing processing of the request further comprises:
        comparing the progress of the request to a threshold;
        in response to a determination that the progress of the request is less than the threshold, retransmitting, requeuing or canceling the request, and
        in response to a determination that the progress of the request is greater than or equal to the threshold:
            determining a new timeout period based on the progress of the request, and
            extending the timeout period of the request to the new timeout period to enable request completion.

13. The method of claim 12, wherein prioritizing requests to be placed in the queue further comprises:
    prioritizing the requests based on a length of time to complete a request, complexity of a request, or importance of a request.

14. The method of claim 12, wherein the progress is based on an amount of work completed by the request.

15. The method of claim 12, wherein the progress is based on an amount of time elapsed towards completion of the request.

16. The method of claim 12, wherein the progress is based on a rate of completion of the request.

17. The method of claim 12, wherein the progress is based on a comparison of an amount of work completed by the request at different times.

18. The method of claim 17, wherein the comparison of the amount of work completed by the request at different times is based on the threshold based on an expected amount of work to be completed by the request.

19. The method of claim 12, wherein the threshold is a dynamically calculated threshold.

20. A non-transitory computer readable medium storing machine readable instructions, that when executed by a computer system, perform a method comprising:
    prioritizing requests to be placed in a queue based on priorities;
    setting an order of placement of the requests in the queue to enable processing of at least one request of each different priority placed in the queue at a predetermined interval based on request priority, wherein the predetermined interval is configurable such that a request of a higher priority is processed after a request of a lower priority; and
    dynamically managing, by a processor, processing of a request from the prioritized requests based on a request processing statistic, the priorities and the order of placement, wherein the request processing statistic includes a progress of the request, and the request includes a timeout period, and wherein dynamically managing processing of the request further comprises:
comparing the progress of the request to a threshold;
 in response to a determination that the progress of the request is less than the threshold, retransmitting, requeuing or canceling the request, and
 in response to a determination that the progress of the request is greater than or equal to the threshold:
  determining a new timeout period based on the progress of the request, and
  extending the timeout period of the request to the new timeout period to enable request completion.

* * * * *